(12) United States Patent
Kin et al.

(10) Patent No.: US 6,349,256 B1
(45) Date of Patent: Feb. 19, 2002

(54) TURNING BEHAVIOR STATE DETECTING SYSTEM FOR VEHICLE

(75) Inventors: Keiyu Kin; Hiroyuki Urabe, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/391,237

(22) Filed: Sep. 7, 1999

(30) Foreign Application Priority Data

Sep. 9, 1998 (JP) .......................................... 10-254958
Sep. 9, 1998 (JP) .......................................... 10-254959

(51) Int. Cl.[7] .............................. B60T 8/58; B60T 8/24
(52) U.S. Cl. .......................................... 701/72; 701/80
(58) Field of Search .................... 701/72, 80; 303/140, 303/146

(56) References Cited

U.S. PATENT DOCUMENTS

| 4,809,181 A | * | 2/1989 | Ito et al. ..................... 701/70 |
| 5,040,115 A | * | 8/1991 | Fukushima et al. ........... 701/70 |
| 5,206,808 A | * | 4/1993 | Inoue et al. ................... 701/72 |
| 5,641,212 A | * | 6/1997 | Sakai .......................... 303/147 |
| 5,676,433 A | * | 10/1997 | Inagaki et al. .............. 303/146 |
| 5,839,799 A | * | 11/1998 | Fukada ....................... 303/146 |
| 6,089,680 A | * | 7/2000 | Yoshioka et al. ........... 303/146 |

FOREIGN PATENT DOCUMENTS

| EP | 775 617 A2 | * | 5/1997 |
| JP | 2-70561 | | 3/1990 |
| JP | 5-155323 | | 6/1993 |

* cited by examiner

*Primary Examiner*—Michael J. Zanelli
(74) *Attorney, Agent, or Firm*—Armstrong, Westerman, Hattori, McLeland & Naughton, LLP

(57) ABSTRACT

The turning behavior state of a vehicle is determined by a determining device, by comparing a front wheel slip angle and a rear wheel slip angle calculated based on a lateral slip angle of a vehicle body by a wheel slip angle calculating device, with a front wheel slip angle limit value and a rear wheel slip angle limit value which are determined based on a vehicle speed detected by a vehicle speed detecting device and a friction coefficient presumed by a friction coefficient presuming device. Thus, even in a state in which the road surface friction coefficient is low, the turning behavior state of the vehicle can be detected precisely.

1 Claim, 13 Drawing Sheets

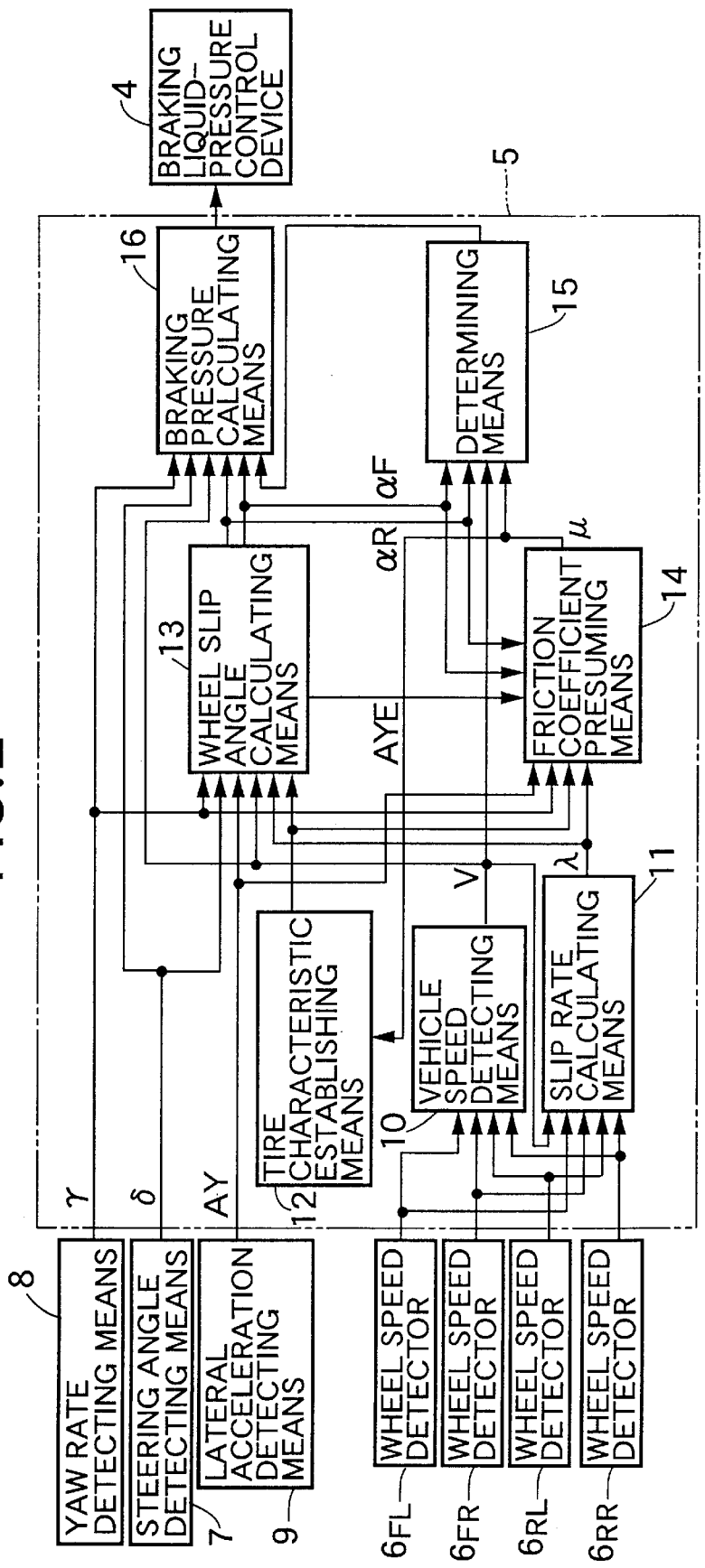

TURNING BEHAVIOR STATE DETECTING SYSTEM FOR VEHICLE

BACKGROUND OF THE INVENTION

1. Field of the Invention

The present invention relates to a turning behavior state detecting system for a vehicle, which is designed to precisely detect the turning behavior state of the vehicle in order to enhance the control accuracy in carrying out the control of the turning motion of the vehicle.

2. Description of the Related Art

There is conventionally known a turning behavior state detecting system for a vehicle in the control of the motion of the vehicle (e.g., in the traction control, anti-lock brake control and the like). Techniques for detecting the turning behavior state of the vehicle are already disclosed, for example, in Japanese Patent Application Laid-open Nos. 2-70561 and 5-155323, and the like.

In the conventionally known system, the turning behavior state of the vehicle is determined based on a difference between a yaw rate detected by a yaw rate detecting means and a reference yaw rate determined based on a steering angle detected by a steering angle detecting means and a vehicle speed detected by a vehicle speed detecting means. However, the reference yaw rate is determined on the basis of a state in which the friction coefficient of a road surface is high. Therefore, in a state in which the vehicle is traveling on a road surface having a low friction coefficient, the reference yaw rate does not correspond to the situation of the road surface, and the detection of the turning behavior state is imprecise.

SUMMARY OF THE INVENTION

Accordingly, it is a first object of the present invention to provide a turning behavior state detecting system for a vehicle, which is designed so that the turning behavior state of the vehicle can be detected precisely even in a state in which the friction coefficient of a road surface is low.

It is a second object of the present invention to provide a turning behavior state detecting system for a vehicle, which is designed so that among the turning behavior states of the vehicle, particularly the over-steered state of the vehicle can be detected precisely even in a state in which the friction coefficient of a road surface is low.

To achieve the above first object, according to a first aspect and feature of the present invention, there is provided a turning behavior state detecting system for a vehicle, comprising a vehicle speed detecting means for detecting a vehicle speed, a wheel slip angle calculating means capable of calculating a front wheel slip angle and a rear wheel slip angle based on a lateral slip angle of a vehicle body, a friction coefficient presuming means for presuming a road surface friction coefficient, and a determining means for determining the turning behavior state of the vehicle by comparing the front wheel slip angle and the rear wheel slip angle calculated by the wheel slip angle calculating means with a front wheel slip angle limit value and a rear wheel slip angle limit value which are determined based on the vehicle speed detected by the vehicle speed detecting means and the friction coefficient presumed by the friction coefficient presuming means.

As used herein, the wheel slip angle is an angle formed by the direction of movement of the wheel with respect to the orientation of the wheel, and the grip force of the wheel to the road surface is varied in accordance with the slip angle and the road surface friction coefficient. On the other hand, the lateral slip angle of the vehicle body is an angle formed by the direction of movement of the vehicle body with respect to the orientation of the vehicle body, and indicates the turning behavior state of the vehicle depending on a variation in grip force of the wheel following variations in the turning movement state of the vehicle and the road surface friction coefficient. On the other hand, the limit value of the wheel slip angle can be previously known in accordance with the vehicle speed and the road surface friction coefficient, and the turning behavior state of the vehicle can be detected by comparing the front and rear wheel slip angles calculated based on the lateral slip angle of the vehicle body with the limit value of the wheel slip angle. Moreover, the wheel slip angle is presumed in accordance with the variation in road surface friction coefficient and hence, the turning behavior state of the vehicle can be detected precisely, with the road surface friction coefficient being reflected thereon.

To achieve the second object, according to a second aspect and feature of the present invention, there is provided a turning behavior state detecting system for a vehicle, comprising a vehicle speed detecting means for detecting a vehicle speed, a vehicle body lateral slip angle presuming means for presuming a lateral slip angle of a vehicle body, a friction coefficient presuming means for presuming a road surface friction coefficient, and a determining means for determining that the vehicle is in an over-steered state, when the vehicle body lateral slip angle determined by the vehicle body lateral slip angle presuming means or the rate of variation in vehicle body lateral slip angle exceeds a limit value determined based on the vehicle speed detected by the vehicle speed detecting means and the friction coefficient presumed by the friction coefficient presuming means, during turning movement of the vehicle.

As used herein, the vehicle body lateral slip angle is an angle formed by the direction of the movement of the vehicle body with respect to the orientation of the vehicle body, and indicates the turning behavior state of the vehicle depending on variations in the motion state of the vehicle and the road surface friction coefficient. On the other hand, a limit value for the vehicle body lateral slip angle can be previously known in accordance with the vehicle speed and the road surface friction coefficient, and when the vehicle body lateral slip angle exceeds the limit value based on the vehicle speed and the road surface friction coefficient during turning movement of the vehicle, it can be determined that the vehicle is in the over-steered state. Thus, the over-steered state can be determined precisely, while reflecting a variation in the road surface friction coefficient. When the rate of variation in the vehicle body lateral slip angle is increased during turning movement of the vehicle, it can be determined that the vehicle approaches the over-steered state. When the rate of variation in the vehicle body lateral slip angle exceeds the limit value based on the vehicle speed and the road surface friction coefficient, it can be determined precisely that the vehicle approaches the over-steered state, while reflecting a variation in road surface friction coefficient.

The above and other objects, features and advantages of the invention will become apparent from the following description of the preferred embodiment taken in conjunction with the accompanying drawings.

BRIEF DESCRIPTION OF THE DRAWINGS

FIGS. 1 to 10 show a first embodiment of the present invention, wherein

FIG. 1 is an illustration showing a driving system and a braking system in a vehicle;

FIG. 2 is a block diagram showing the arrangement of a control unit;

FIG. 4 is a block diagram showing the arrangement of a wheel slip angle calculating means in the control unit;

FIG. 5 is a diagram showing the balance of the lateral force in a linear two-wheel vehicle motion model;

FIG. 6 is a diagram showing tire characteristics used in the linear two-wheel vehicle motion model;

FIG. 7 is a block diagram showing the arrangement of a friction coefficient presuming means;

FIG. 8 is a diagram showing the vehicle body moment generated by cornering forces and braking/driving forces during turning movement of the vehicle;

FIG. 9 a block diagram showing the arrangement of a means for determining the turning behavior of the vehicle;

FIG. 10 is a diagram showing a map for establishing the limit value of lateral slip angle of a vehicle body in accordance with the vehicle speed and the friction coefficient;

FIGS. 11 to 14 show a second embodiment of the present invention, wherein

FIG. 11 is a block diagram showing the arrangement of a control unit;

FIG. 12 is a block diagram showing the arrangement of a vehicle body lateral slip angle presuming means in the control unit;

FIG. 13 is a diagram showing a map for establishing the limit value of yaw rate;

FIG. 14 is a diagram showing a map for establishing the limit value of lateral slip angle of the vehicle body.

DESCRIPTION OF THE PREFERRED EMBODIMENTS

Figure 1:
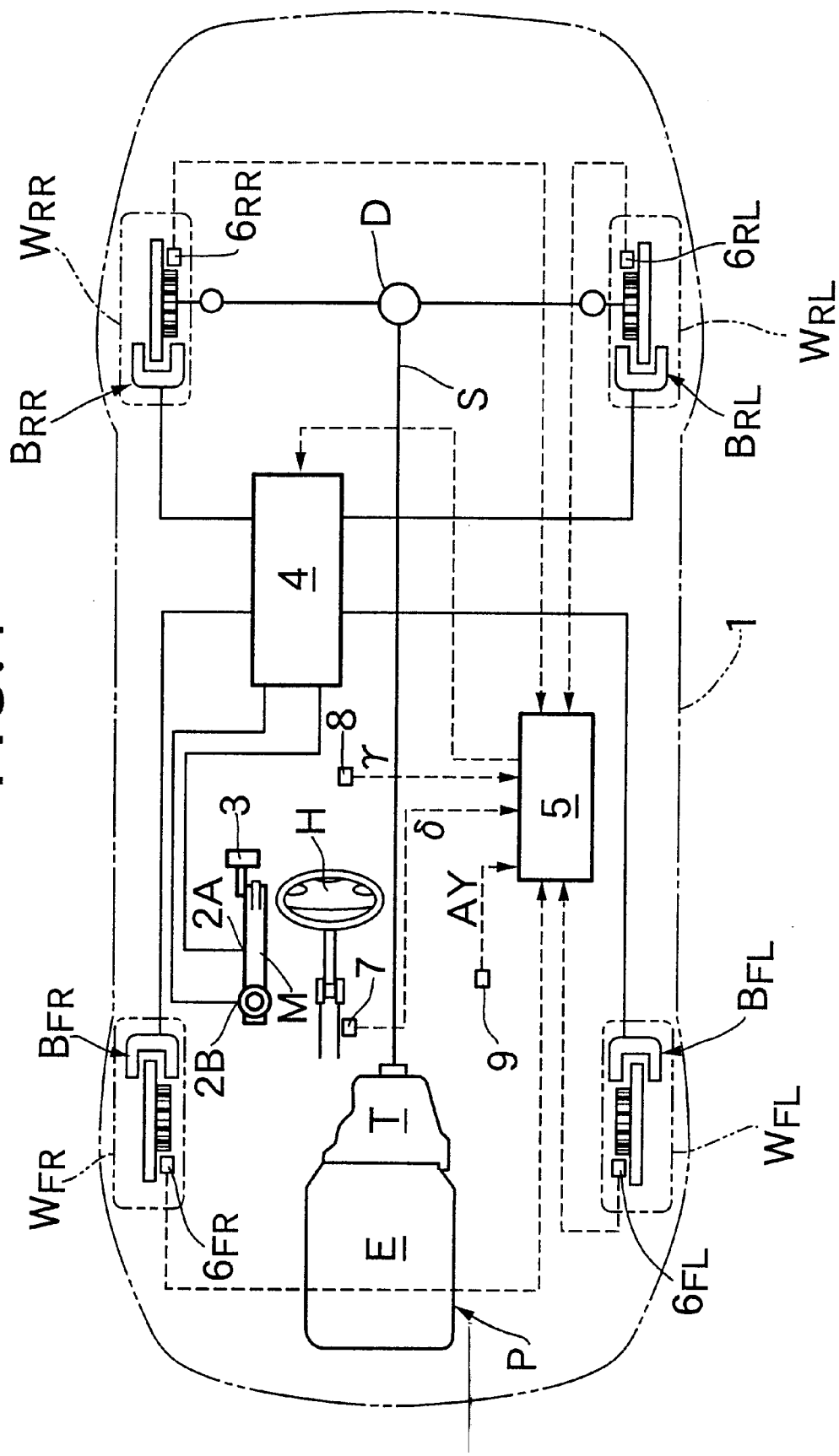

A first embodiment of a system for detecting the turning behavior state of a vehicle according to the present invention will now be described with reference to FIGS. 1 to 10. Referring first to FIG. 1, a power unit P comprising of an engine E and a transmission T is mounted at a front portion of a vehicle body 1. A power from the power unit P is transmitted through a propelling shaft S and a differential D to left and right rear wheels $W_{RL}$ and $W_{RR}$ which are driven wheels. Left and right front wheel brakes $B_{FL}$ and $B_{FR}$ are mounted on left and right front wheels $W_{FL}$ and $W_{FR}$, and left and right rear wheel brakes $B_{RL}$ and $B_{RR}$ are mounted on the left and right rear wheels $W_{RL}$ and $W_{RR}$. Each of the wheel brakes $B_{FL}$, $B_{FR}$, $B_{RL}$ and $B_{RR}$ is a disk brake, for example.

A braking liquid-pressure depending on the depression of a brake pedal 3 is output from first and second output ports 2A and 2B provided in a tandem-type master cylinder M. The output ports 2A and 2B are connected to a braking liquid-pressure control device 4, and a braking liquid-pressure from the braking liquid-pressure control device 4 is applied to each of the wheel brakes $B_{FL}$, $B_{FR}$, $B_{RL}$ and $B_{RR}$. In the braking liquid-pressure control device 4, the braking liquid-pressure applied to each of the wheel brakes $B_{FL}$, $B_{FR}$, $B_{RL}$ and $B_{RR}$ is regulated by control by a control unit 5. Input to the control unit 5 are detection values provided by wheel speed detectors $6_{FL}$, $6_{FR}$, $6_{RL}$ and $6_{RR}$ for detecting wheel speeds of the wheels $W_{FL}$, $W_{FR}$, $W_{RL}$ and $W_{RR}$, respectively, a steering angle detecting means 7 for detecting a steering angle δ resulting from the operation of a steering wheel H, a yaw rate detecting means 8 for detecting a yaw rate γ of the vehicle, and a lateral acceleration detecting means 9 for detecting a lateral acceleration AY of the vehicle.

Referring to FIG. 2, the control unit 5 includes a vehicle speed detecting means 10, a slip rate calculating means 11, a tire characteristic establishing means 12, a wheel slip angle calculating means 13, a friction coefficient presuming means 14, a determining means 15 for determining a turning behavior state of the vehicle, and a braking pressure calculating means 16 for calculating braking pressures for the wheel brakes $B_{FL}$, $B_{FR}$, $B_{RL}$ and $B_{RR}$ in the braking liquid-pressure control device 4.

In the vehicle speed detecting means 10, a vehicle speed V is determined based on the detection values provided by the four wheel speed detectors $6_{FL}$, $6_{FR}$, $6_{RL}$ and $6_{RR}$ for individually detecting the wheel speeds of the wheels, respectively. In the slip rate calculating means 11, a slip rate λ for each of the wheels is calculated based on the vehicle speed V calculated by the vehicle speed detecting means 10 and the detection values provided by the wheel speed detectors $6_{FL}$, $6_{FR}$, $6_{RL}$ and $6_{RR}$.

Figure 3A:
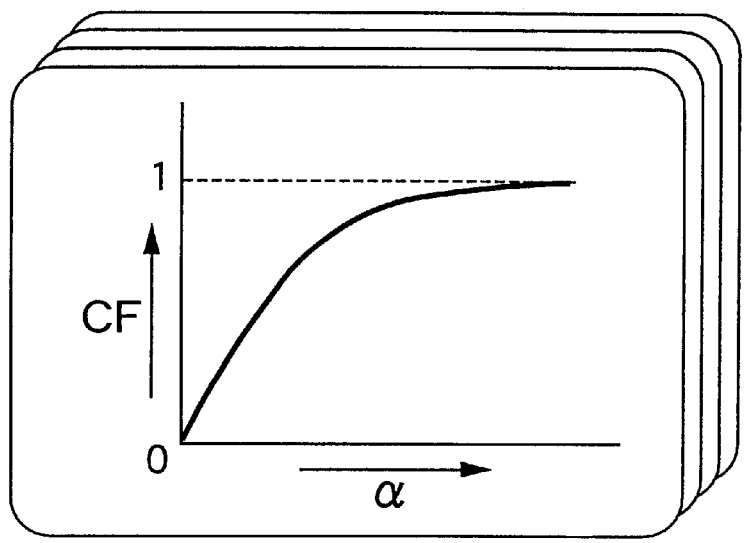
FIGS. 3A to 3C are diagrams showing tire characteristics established by a tire characteristic establishing means.
Figure 3B:
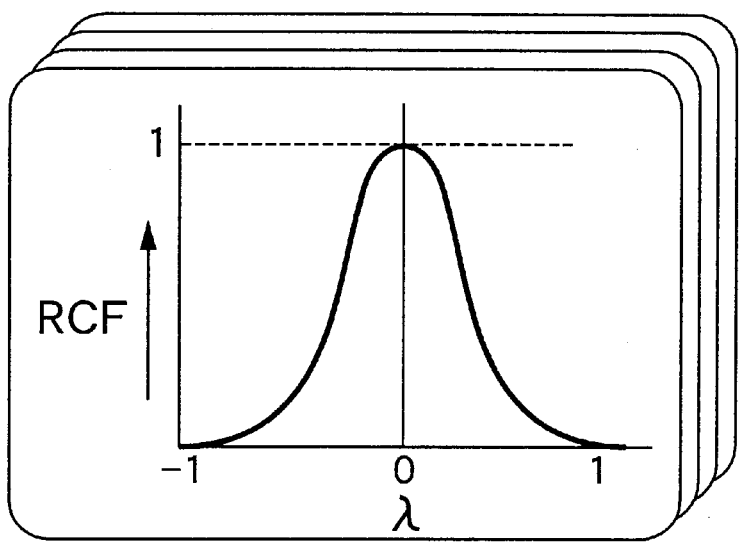
Figure 3C:
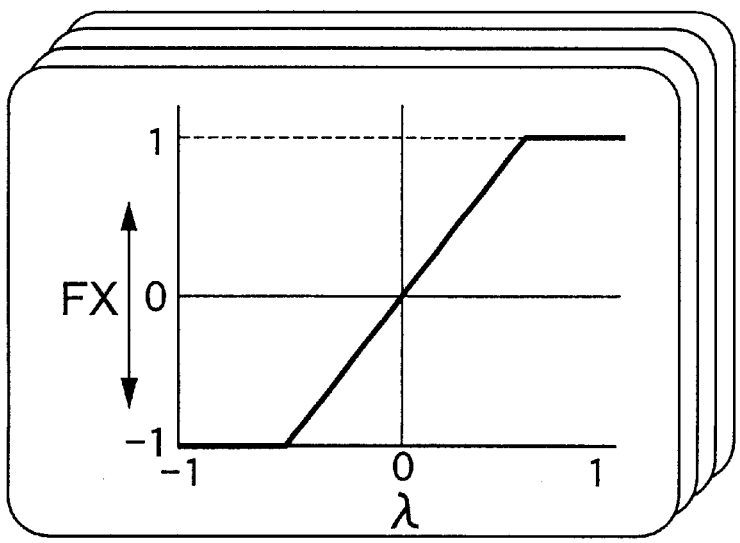

Tire characteristics for each of tires of the wheels are previously established based on actual travel data in the tire characteristic establishing means 12. As shown in FIGS. 3A to 3C, the following characteristics: a slip angle/cornering force characteristic showing the relationship between the slip angle a of the wheel and the cornering force CF, a slip rate/cornering force-decreasing rate characteristic showing the relationship between the slip rate λ and the cornering force-decreasing rate RCF, and a slip rate/braking and driving force characteristic showing the relationship between the slip rate λ and the braking and driving force FX, are previously established in individual correspondence to the left and right front wheels and the left and right rear wheels in accordance with the friction coefficient μ of a road surface presumed by the friction coefficient presuming means 14. Namely, the tire characteristic establishing means 12 has a function to correct the slip angle/cornering force characteristic, the slip rate/cornering force-decreasing rate characteristic and the slip rate/braking and driving force characteristic in accordance with the presumed friction coefficient αR provided by the friction coefficient presuming means 14.

The wheel slip angle calculating means 13 calculates a front wheel slip angle αF and a rear wheel slip angle αR based on a lateral slip angle β of the vehicle in order to enhance the control accuracy for controlling the turning movement of the vehicle. The front wheel slip angle αF and the rear wheel slip angle αR are calculated by the wheel slip angle calculating means 13, based on the steering angle δ detected by the steering angle detecting means 7, the yaw rate γ detected by the yaw rate detecting means 8, the lateral acceleration AY detected by the lateral acceleration detecting means 9, the vehicle speed V detected by the vehicle speed detecting means 10, the slip rates λ of the wheels calculated by the slip rate calculating means 11 and the tire characteristics established in the tire characteristic establishing means 12. The front wheel slip angle αF and the rear wheel slip angle αR determined by the wheel slip angle calculating means 13 are input to the determining means 15, where the turning behavior state of the vehicle is determined based on the front wheel slip angle αF and the rear wheel slip angle αR.

Figure 4:
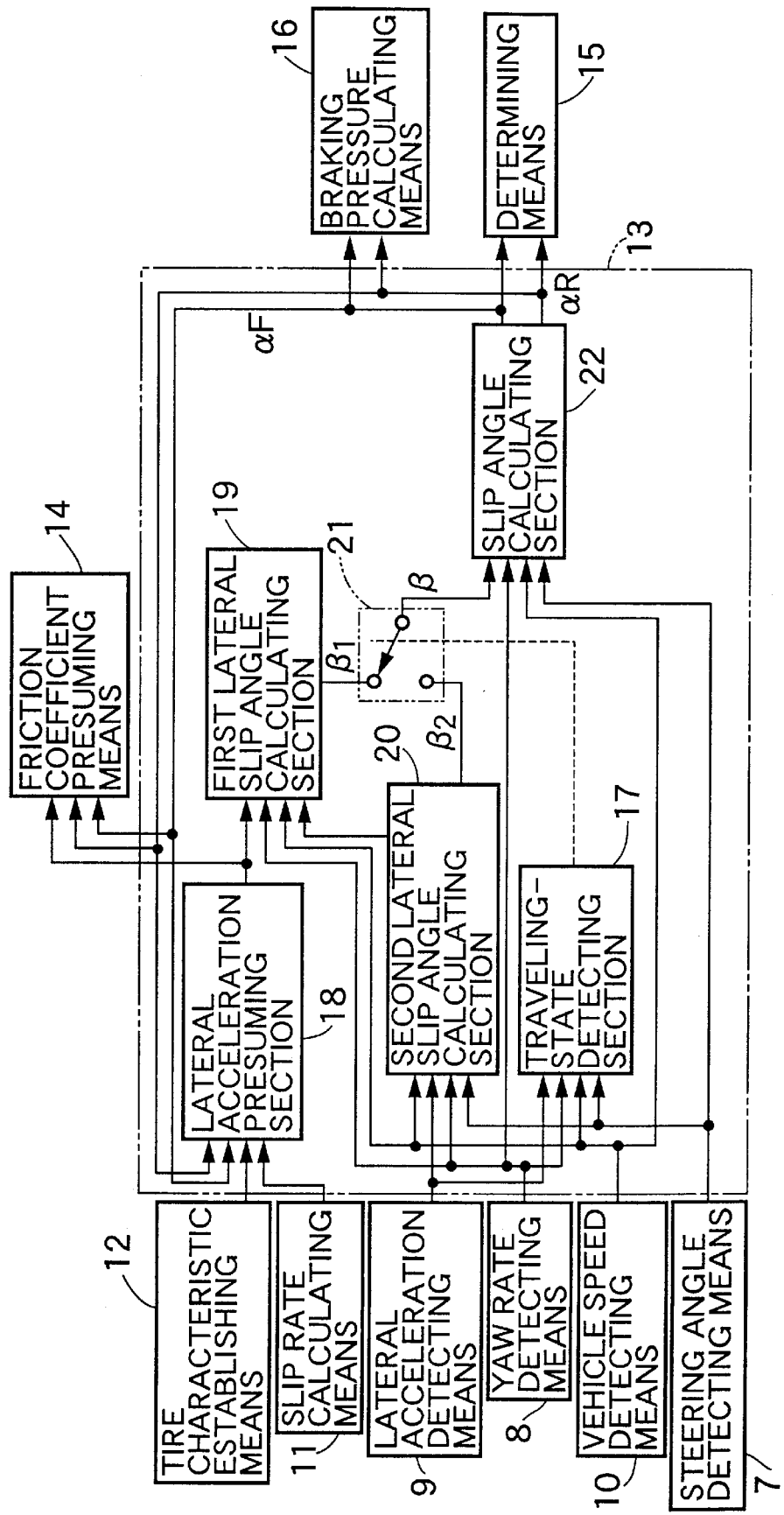

Referring to FIG. 4, the wheel slip angle calculating means 13 includes a traveling-state detecting section 17, a lateral acceleration presuming section 18, a first lateral slip angle calculating section 19, a second lateral slip angle calculating section 20, a selecting section 21, and a slip angle calculating section 22.

An presumed lateral acceleration AYE is presumed by the lateral acceleration presuming section 18 based on the slip angle/cornering force characteristic and the slip rate/cornering force-decreasing rate characteristic of the tire characteristics established in the tire characteristic establishing means 12. More specifically, the tire characteristic establishing means 12 is connected to the lateral acceleration presuming section 18, and the slip rate λ calculated by the slip rate calculating means 11 as well as the front wheel slip angle αF and the rear wheel slip angle αR calculated by the slip angle calculating section 22 are input to the lateral acceleration presuming section 18. Thus, the presumed lateral acceleration AYE is determined in the lateral acceleration presuming section 18, based on a total sum of values (CF×RCF) of the four wheels, i.e., the left and right front wheels and the left and right rear wheels.

The cornering force CF is corrected in response to a variation in the slip rate λ following the control of the vehicle motion, by multiplying the cornering force CF by the cornering force decreasing rate RCF based on the slip rate/cornering force-decreasing rate characteristic in the above calculation (CF×RCF).

The presumed lateral acceleration AYE determined by the lateral acceleration presuming section 18 is input to the first lateral slip angle calculating section 19. The vehicle speed V detected by the vehicle speed detecting means 10 and the yaw rate γ detected by the yaw rate detecting means 8 in addition to the presumed lateral acceleration AYE have been input to the first lateral slip angle calculating section 19, and the calculation for determining the lateral slip angle of the vehicle body as a first lateral slip angle β1 based on a non-linear four-wheel vehicle motion model is carried out in the first lateral slip angle calculating section 19.

The term "non-linear four-wheel vehicle motion model" used herein means a motion model reflecting tire characteristics in which the cornering force for each of the wheels is varied non-linearly with respect to the slip angle in a state in which it is not on the assumption that the cornering forces for the left and right front wheels and for the left and right rear wheels are equal to each other.

According to a differentiating equation based on a basic linear two-wheel vehicle motion model, a differentiation value of the lateral slip angle is determined as {(lateral acceleration/vehicle speed)−yaw rate}. If the lateral acceleration is defined as the presumed lateral acceleration AYE; the vehicle speed is defined as a vehicle speed V detected by the vehicle speed detecting means 10, and the yaw rate is defined as a yaw rate γ detected by the yaw rate detecting means 8, a differentiation value (dβ1/dt) of the first lateral slip angle β1 is determined according to the following equation:

$$d\beta 1/dt = (AYE/V) - \gamma \quad (1)$$

By integrating the differentiation value (dβ1/dt), the first lateral slip angle β1 is determined in the first lateral slip angle calculating section 19 according to the following equation:

$$\beta 1 = \int \{(AYE/V) - \gamma\} dt + \beta 1_0 \quad (2)$$

wherein $\beta 1_0$ is an initial value of the first lateral slip angle β1 and input from the second lateral slip angle calculating section 20.

The first lateral slip angle β1 determined based on the non-linear four-wheel vehicle motion model is equal to a lateral slip angle at the time when the lateral slip amount is relatively large in the turning motion state of the vehicle. However, when the lateral slip amount is relatively small in a state in which the vehicle is in a state in which it is traveling straightforwardly at a low speed, an error due to the accumulation of noises in the course of integrating calculation of the first lateral slip angle β1 is relatively large, and it is not appropriate that the front wheel slip angle αF and the rear wheel slip angle αR are determined using the first lateral slip angle β1 in the state in which the vehicle is traveling straightforwardly at the low speed. Therefore, the calculation for determining the lateral slip angle of the vehicle body as a second lateral slip angle β2 based on the linear two-wheel vehicle motion model is carried out in the second lateral slip angle calculating section 20.

The term "linear two-wheel vehicle motion model" used herein means a motion model in which the cornering forces for the front and rear wheels are varied linearly with respect to the slip angle in a state in which it is on the assumption that the cornering forces for the left and right front wheels are equal to each other and the cornering forces for the left and right rear wheels are equal to each other.

Figure 5:
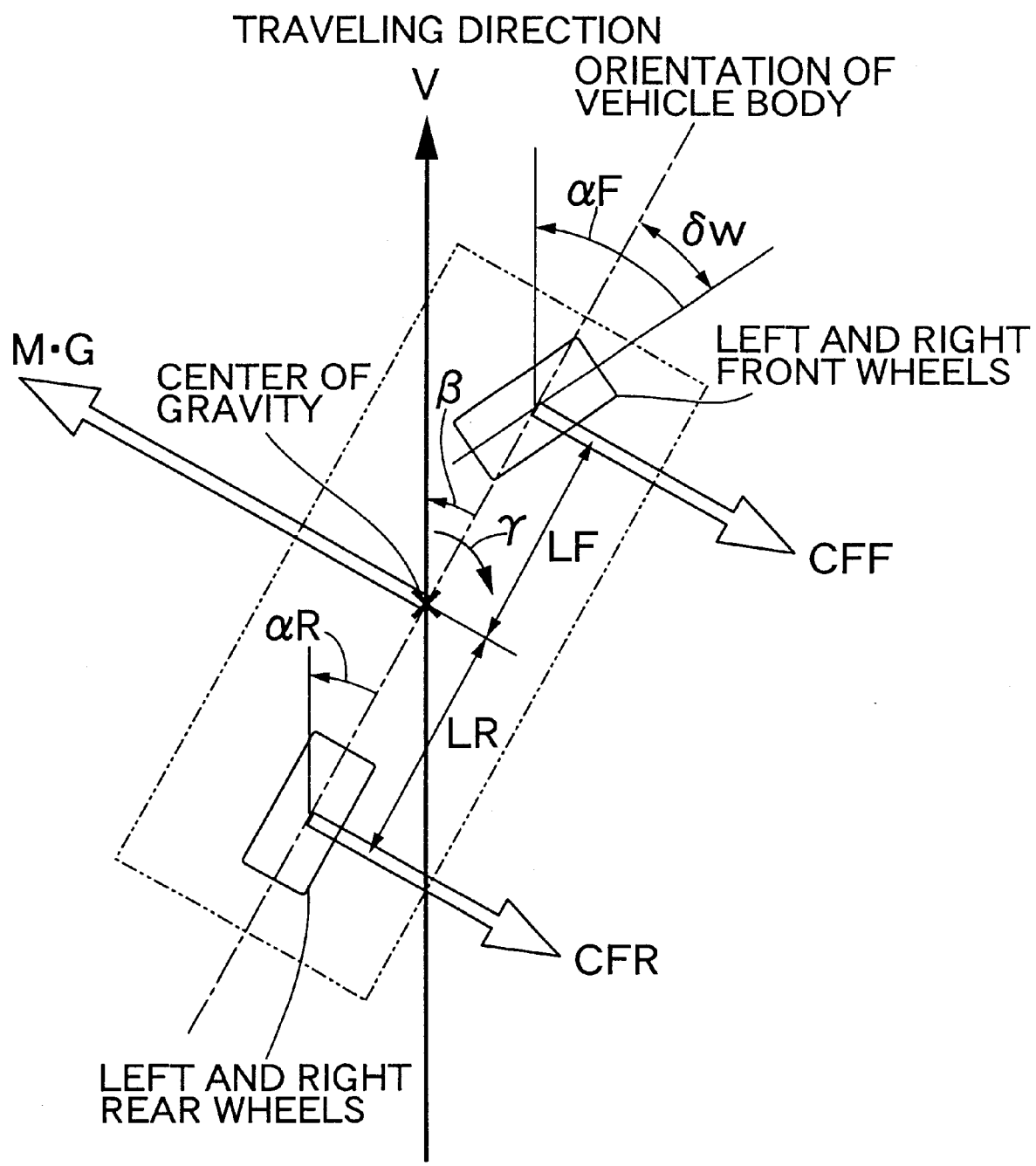

In the linear two-wheel vehicle motion model, a lateral dynamical equation is used in which the cornering forces for the left and right front wheels CFF are equal to each other and the cornering forces for the left and right rear wheels CFR are equal to each other, as shown in FIG. 5. In FIG. 5, the slip angle αF of the front wheels, the slip angle αR of the rear wheels and the lateral slip angle β of the vehicle body are represented with the counterclockwise direction being defined as positive. If the mass of the vehicle is represented by M; the cornering force for the front wheels is represented by CFF and the cornering force for the rear wheels is represented by CFR, the following equation is established:

$$M \cdot AY = CFF + CFR \quad (3)$$

Figure 6:
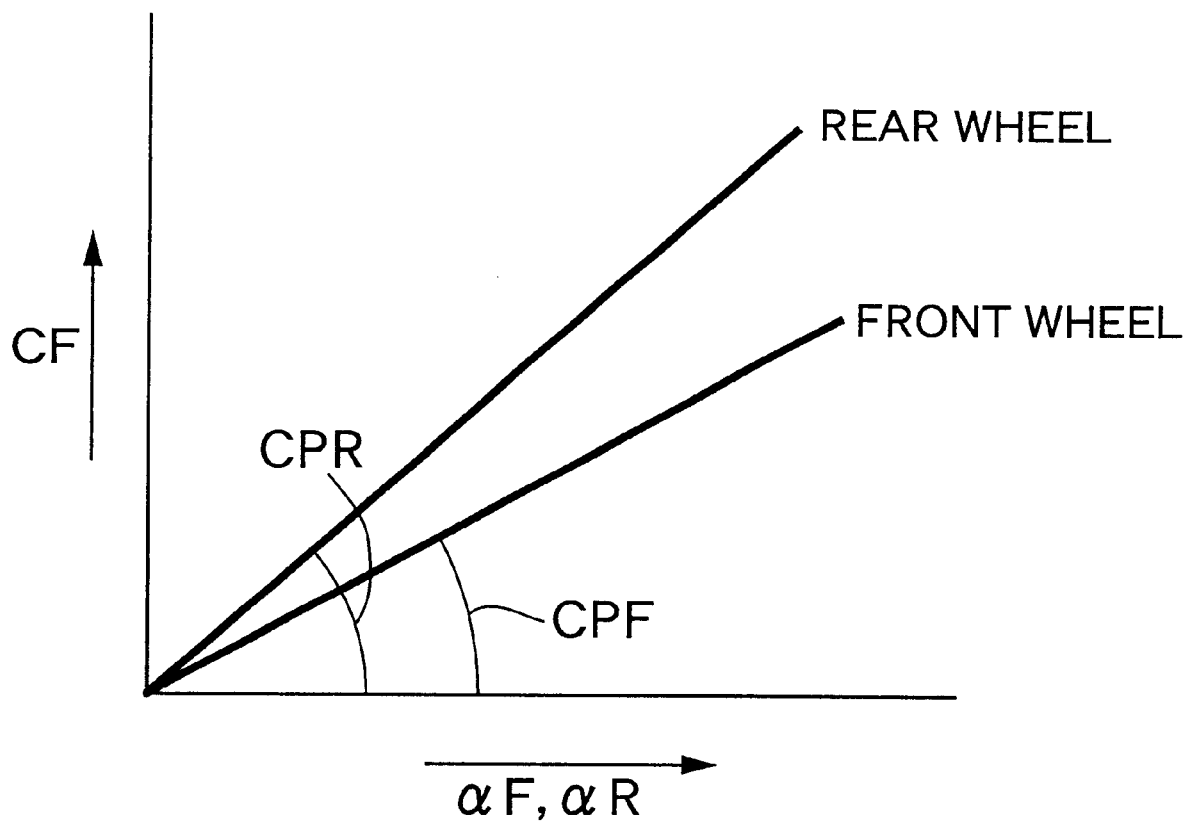

The cornering force CF is linear as shown in FIG. 6, when each of the front wheel slip angle αF and the rear wheel slip angle αR is in a small range. Therefore, if the cornering power for the front wheels is represented by CPF and the cornering power for the rear wheels is represented by CPR, the following equations are established:

$$CFF = CPF \times \alpha F \quad (4)$$

$$CFR = CPR \times \alpha R \quad (5)$$

The front wheel slip angle αF and the rear wheel slip angle αR can be represented as follows, using a distance LF from the center of gravity of the vehicle body to the front wheels, a distance LR from the center of gravity of the vehicle body to the rear wheels, the vehicle speed V, the lateral slip angle β of the vehicle body, the yaw rate γ and an actual steering angle δw of the front wheels:

$$\alpha F = \beta + (LF/V) \times \gamma - \delta w \quad (6)$$

$$\alpha R = \beta - (LR/V) \times \gamma \quad (7)$$

In this case, the actual steering angle δw of the front wheel is determined by dividing the steering angle δ detected by the steering angle detecting means 7 by a gear ratio in a steering system.

If the above equations (4) to (7) are substituted into the equation (3), the following equation is established:

$$M \times AY = CPF \times \{\beta + (LF/V) \times \gamma - \delta w\} + CPR \times \{\beta - (LR/V) \times \gamma\} \quad (8)$$

If this equation (8) is rearranged for β, the following equation can be provided:

$$\beta = \{M/(CPF+CPR)\} \times AY - \{(CPF \times LF - CPR \times LR)/(CPF+CPR)\} \times \gamma/V + \{CPF/(CPF+CPR)\} \times \delta w \quad (9)$$

Thus, CPF, CPR, LF, LR and M are given values peculiar to the vehicle and hence, the equation (9) can be rewritten as follows:

$$\beta = C1 \times AY - C2 \times \gamma/V + C3 \times \delta w \quad (10)$$

The second lateral slip angle calculating section 20 performs the calculation based on the equation (10). The vehicle speed V detected by the vehicle speed detecting means 10, the yaw rate γ detected by the yaw rate detecting means 8, the lateral acceleration AY detected by the lateral acceleration detecting means 9 and the steering angle δ detected by the steering angle detecting means 7 are input to the second lateral slip angle calculating section 20, and the second lateral slip angle calculating section 20 outputs the lateral slip angle β determined by the calculation based on the equation (10) as the second lateral slip angle β2.

The first lateral slip angle β1 calculated by the first lateral slip angle calculating section 19 and the second lateral slip angle β2 calculated by the second lateral slip angle calculating section 20 are alternatively selected by the selecting section 21 and input to the slip angle calculating section 22. The alternative selection in the selecting section 21 is switched over by the traveling-state detecting section 17.

The travelling-state detecting section 17 detects a traveling state of the vehicle based on the vehicle speed V detected by the vehicle speed detecting means 10, the yaw rate γ detected by the yaw rate detecting means 8, the lateral acceleration AY detected by the lateral acceleration detecting means 9 and the steering angle δ detected by the steering angle detecting means 7, and for example, determines whether all the following conditions are established:

$$V<10 \text{ km/hr} -3 \text{ (deg)} < \delta <+3 \text{ (deg)} -0.1 \text{ } (G)<AY<+0.1 \text{ } (G) -1.0 \text{ (deg/sec)}<\gamma<+1.0 \text{ (deg/sec)}$$

When all of the above conditions have been established, the traveling-state detecting section 17 determines that the vehicle is in a state in which it is travelling straightforwardly at a low speed, and a signal indicative of command to select the second lateral slip angle β2 calculated by the second lateral slip angle calculating section 20 by the selecting section 21 is applied to the selecting section 21. However, when even one of the conditions Is not established, a signal indicative of command to select the first lateral slip angle β1 calculated by the first lateral slip angle calculating section 19 Is delivered to the selecting section 21.

In the slip angle calculating section 22, the calculation of the front wheel slip angle αF and the rear wheel slip angle αR based on the above-described equations (6) and (7) is carried out using the first lateral slip angle β1 or the second lateral slip angle β2 selected by the selecting section 21 and input to the slip angle calculating section 22, and using the vehicle speed V detected by the vehicle speed detecting means 10, the yaw rate γ detected by the yaw rate detecting means 8 and the steering angle δ detected by the steering angle detecting means 7. Namely, in the slip angle calculating section 22, the front wheel slip angle αF and the rear wheel slip angle αR are calculated according to the equations (6) and (7). The front wheel slip angle αF and the rear wheel slip angle αR determined in the slip angle calculating section 22 are input to the lateral acceleration presuming section 18 and to the determining means 15 and the friction coefficient presuming means 14 in order to calculate the presumed lateral acceleration AYE in the lateral acceleration presuming section 18.

Figure 7:
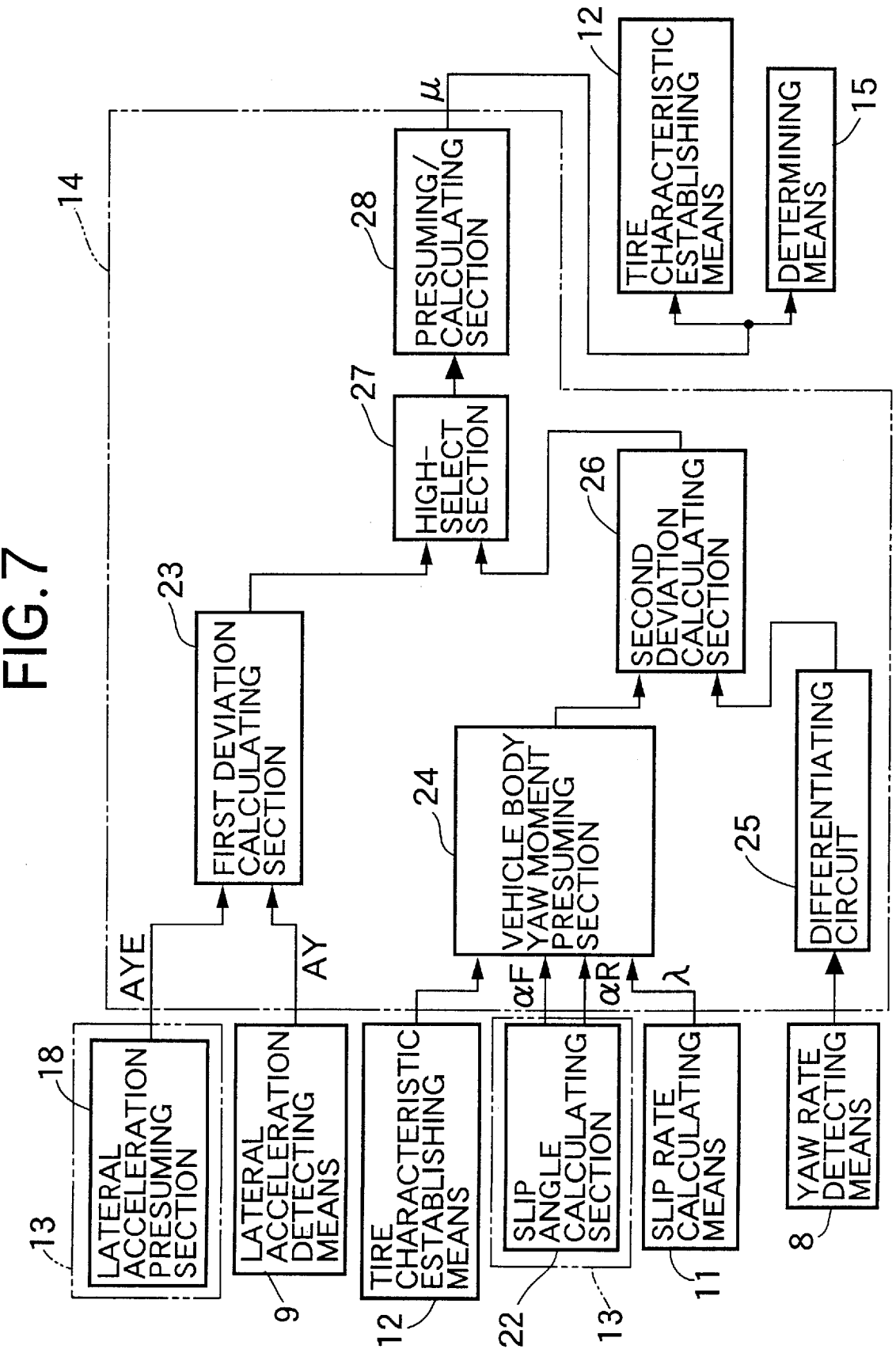

Referring to FIG. 7, the friction coefficient presuming means 14 includes a first deviation calculating means 23, a vehicle yaw moment presuming section 24, a differentiating circuit 25, a second deviation calculating section 26, a high-select section 27 and an presuming/calculating section 28.

In the first deviation calculating section 23, a difference (AYE−AY) between the presumed lateral acceleration AYE determined by the lateral acceleration presuming section 18 in the wheel slip angle calculating means 13 and the lateral acceleration AY detected by the lateral acceleration detecting means 9 is calculated.

On the other hand, the second deviation calculating section 26 calculates a difference {(dγ/dt)E−dγ/dt} between an presumed yaw rate variation rate (dγ/dt)E as a vehicle body yaw moment presumed by the vehicle body yaw moment presuming section 24 based on the tire characteristics established by the tire establishing means 12, the wheel slip rate calculated by the slip rate calculating means 11 and the front and rear wheel slip angles calculated by the slip angle calculating section 22 of the wheel slip angle calculating means 13, and a yaw rate variation speed dγ/dt determined by the differentiating circuit 25 for differentiating the yaw rate γ detected by the yaw rate detecting means 8.

Figure 8:
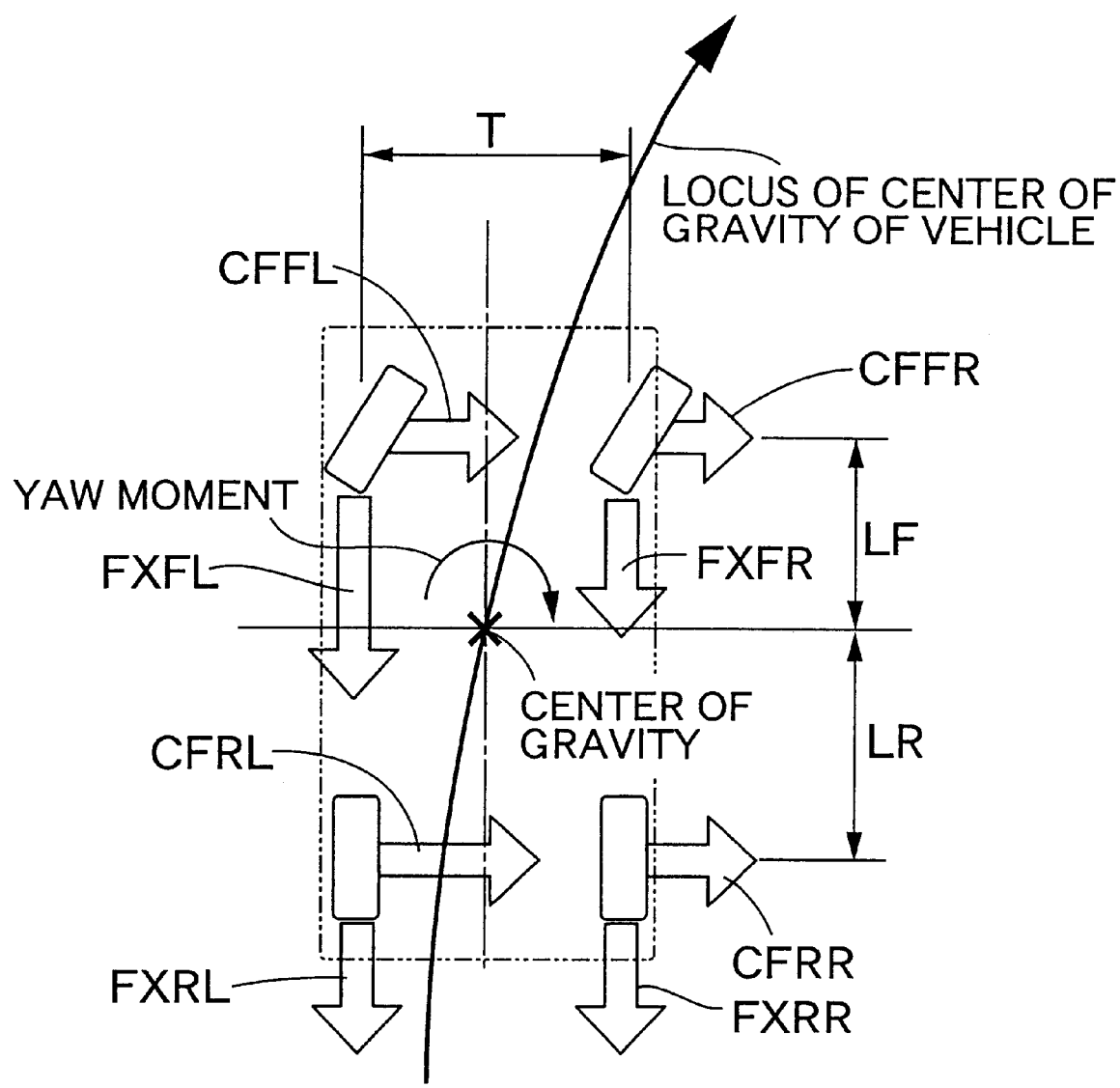

Referring to FIG. 8, if the cornering forces for the left and right front wheels and the left and right rear wheels during turning movement of the vehicle are represented by CFFL, CFFR, CFRL and CFRR; the braking and driving forces for the left and right front wheels and the left and right rear wheels are represented by FXFL, FXFR, FXRL and FXRR; and treads between the left and right front wheels and between the left and right rear wheels are represented by T, the presumed yaw rate variation speed (dγ/dt)E as the yaw moment of the vehicle body is presumed in the vehicle body yaw moment presuming section 24 by the calculation according to the following equation:

$$(d\gamma/dt)E = (CFFL+CFFR) \times LF + (CFRL+CFRR) \times LR + (FXFL+FXFR+FXRL+FXRR) \times T/2 \quad (11)$$

In the above equation (11), CFFL, CFFR, CFRL and CFRR are determined by carrying out the calculation of (CF×RCF) for each of the left and right front wheels and the left and right rear wheels based on the slip angle/cornering force characteristic and the slip rate/cornering force-decreasing rate characteristic established in the tire characteristic establishing means 12, and FXFL, FXFR, FXRL and FXRR are determined for each of the left and right front wheels and the left and right rear wheels based on the slip rate/braking and driving force characteristic established in the tire characteristic establishing means 12.

To carry out the calculation according to the equation (11), the tire characteristics established by the tire characteristic establishing means 12, the slip rate λ calculated by the slip rate calculating means 11 and the front and rear wheel slip angles αF and αR calculated by the slip angle calculating section 22 of the wheel slip angle calculating means 13 are input to the vehicle body yaw moment presuming section 24.

The lateral acceleration AYE presumed by the lateral acceleration presuming section 18 and the yaw rate variation speed (dγ/dt)E presumed by the vehicle body yaw moment presuming section 24 are based on the tire characteristics established by the tire characteristic establishing means 12. Therefore, when the friction coefficient μ of an actual road surface is varied from the friction coefficient $\mu$ in the tire characteristics used for the calculation of the lateral acceleration AYE and the yaw rate variation speed (d$\gamma$/dt)E, a deviation corresponding to the variation in friction coefficient $\mu$ must be produced between the lateral acceleration AY detected by the lateral acceleration detecting means 9 and the presumed lateral acceleration AYE, and a deviation corresponding to the variation in friction coefficient $\mu$ must be produced between the differentiation value (d$\gamma$/dt) of the yaw rate $\gamma$ detected by the yaw rate detecting means 8 and the yaw rate variation speed presumed by the vehicle body yaw moment presuming section 24. Such two deviations, i.e., the presumed deviation between the lateral accelerations and the yaw rate variation rate (the rate of the yaw rate) appear remarkably when the road surface friction coefficient is relatively large and when the road surface friction coefficient is relatively small, respectively. Therefore, a larger one of the value calculated by the first deviation calculating section 23 for calculating the deviation between the detected lateral acceleration AY and the presumed lateral acceleration AYE and the value calculated by the second deviation calculating section 26 for calculating the deviation between the differentiation value (d$\gamma$/dt) of the detected yaw rate $\gamma$ and the presumed yaw rate variation speed (d$\gamma$/dt)E, i.e., one of these values which is largely influenced by the variation in friction coefficient $\mu$, is determined to be a deviation corresponding to the amount of variation in friction coefficient $\mu$, and is selected by the high-select section 27. On the basis of the determination that the deviation selected by the high-select section 27 corresponds to the deviation between the friction coefficients $\mu$, the friction coefficient $\mu$ is presumed in the presuming/calculating section 28.

More specifically, in the presuming/calculating section 28, the friction coefficient $\mu$ in the current processing loop is presumed by determining the initial value of the friction coefficient $\mu$ as "1" and adding or subtracting the amount of variation in friction coefficient corresponding to the deviation calculated by the first or second deviation calculating section 23 or 26 corresponding to the amount of variation in friction coefficient $\mu$ to or from the friction coefficient $\mu$ provided in the last processing loop.

Figure 9:
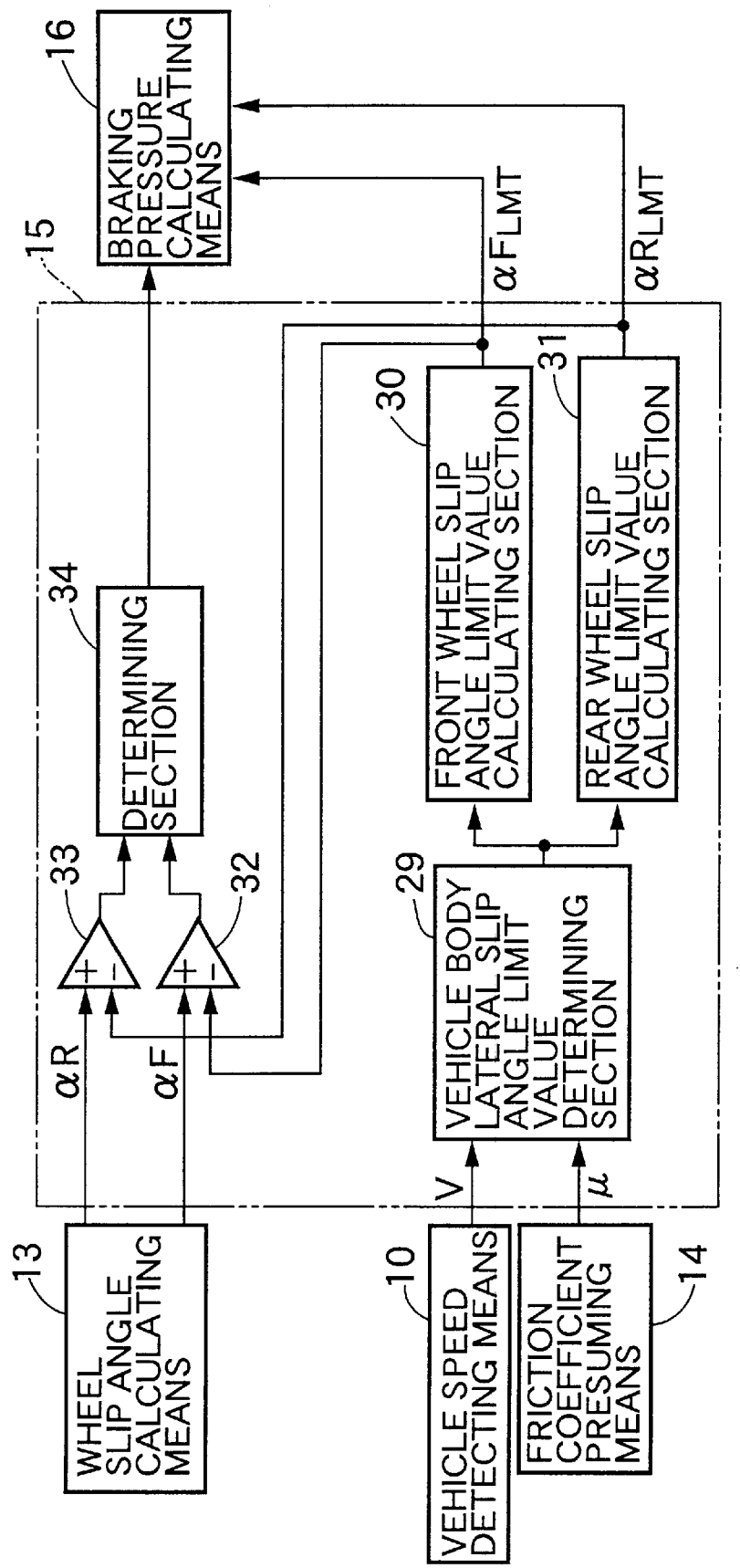

Referring to FIG. 9, the determining means 15 determines the turning behavior state of the vehicle based on the two-wheel model in which the left and right wheel slip angles are equal to each other. The determining means 15 includes a vehicle body lateral slip angle limit value determining section 29, a front wheel slip angle limit value calculating section 30, a rear wheel slip angle limit value calculating section 31, first and second comparators 32 and 33, and a determining section 34.

Figure 10:
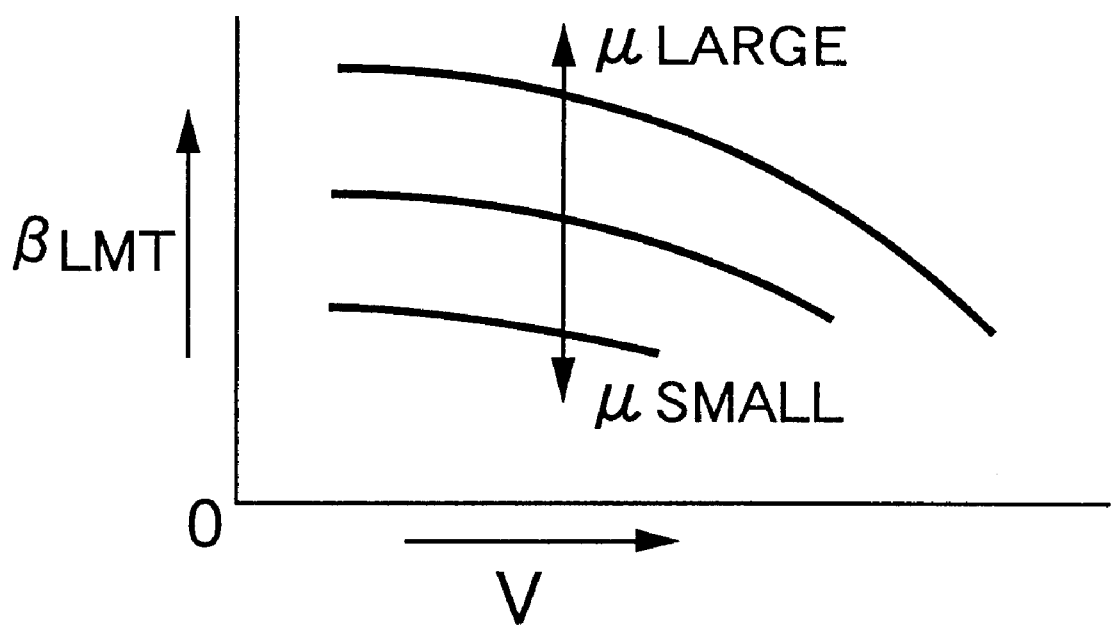

The vehicle speed V detected by the vehicle speed detecting means 10 and the road surface friction coefficient $\mu$ presumed by the friction coefficient presuming means 14 are input to the vehicle body lateral slip angle limit value determining section 29. A map, in which the lateral slip angle limit value $\beta_{LMT}$ is determined in accordance with the vehicle speed V and the friction coefficient $\mu$ in such a manner that it is decreased with an increase in vehicle speed V and increased with an increase in friction coefficient $\mu$, as shown in FIG. 10, is previously established in the vehicle body lateral slip angle limit value determining section 29. Thus, a lateral slip angle limit value $\beta_{LMT}$ in accordance with the vehicle speed V and the friction coefficient $\mu$ is determined in the vehicle body lateral slip angle limit value determining section 29.

The front wheel slip angle limit value calculating section 30 calculates a front wheel slip angle limit value $\alpha F_{LMT}$ by substituting the lateral slip angle limit value $\beta_{LMT}$ determined by the vehicle body lateral slip angle limit value determining section 29 into the equation (6), i.e., $\{\alpha F=\beta+(LF/V)\times\gamma-\delta w\}$.

The rear wheel slip angle limit value calculating section 31 calculates a rear wheel slip angle limit value $\alpha R_{LMT}$ by substituting the lateral slip angle limit value $\beta_{LMT}$ determined by the vehicle body lateral slip angle limit value determining section 29 into the equation (7), i.e., $\{\alpha R=\beta-(LR/V)\times\gamma\}$.

The front wheel slip angle $\alpha F$ calculated by the wheel slip angle calculating means 13 is input to a non-inverted input terminal of the first comparator 32, and the front wheel slip angle limit value $\alpha F_{LMT}$ calculated by the front wheel slip angle limit value calculating section 30 is input to an inverted input terminal of the first comparator 32.

The rear wheel slip angle $\alpha R$ calculated by the wheel slip angle calculating means 13 is input to a non-inverted input terminal of the second comparator 33, and the rear wheel slip angle limit value $\alpha R_{LMT}$ calculated by the rear wheel slip angle limit value calculating section 31 is input to an inverted input terminal of the second comparator 33.

Outputs from the first and second comparators 32 and 33 are input to the determining section 34, and the determining section 34 determines the turning behavior state of the vehicle based on the outputs from the first and second comparators 32 and 33 in the following manner:

The determining section 34 determines that the vehicle is in an out-of-course state, when both of the outputs from the first and second comparators 32 and 33 are at high levels, i.e., when $\alpha F>\alpha F_{LMT}$ and $\alpha R>\alpha R_{LMT}$; determines that the vehicle is in a rather under-steered state, when the output from the first comparator 32 is at high level and the second comparator 33 is at low level, i.e., when $\alpha F>\alpha F_{LMT}$ and $\alpha R\leq\alpha R_{LMT}$; determines that the vehicle is in a rather over-steered state, when the output from the first comparator 32 is at the low level and the output from the second comparator 33 is at the high level, i.e., when $\alpha F\leq\alpha F_{LMT}$ and $\alpha R>\alpha R_{LMT}$; and determines that the vehicle is in a usual turning state, when both of the outputs from the first and second comparators 32 and 33 are at the low levels, i.e., when $\alpha F\leq\alpha F_{LMT}$ and $\alpha R\leq\alpha R_{LMT}$.

Referring again to FIG. 2, (1) the result of determination of the turning behavior state of the vehicle by the determining means 15, i.e., the result of the determination provided by the determining section 34 and (2) the front and rear wheel slip angle limit values $\alpha F_{LMT}$ and $\alpha R_{LMT}$ calculated respectively by the front and rear wheel slip angle limit value calculating sections 30 and 31 in the determining means 15, are input to the braking pressure calculating means 16. Input to the braking pressure calculating means 16 are, in addition to the input from the determining means 15, the steering angle $\delta$ detected by the steering angle detecting means 7, the yaw rate $\gamma$ detected by the yaw rate detecting means 8, the vehicle speed V detected by the vehicle speed detecting means 10, and the front and rear wheel slip angles $\alpha F$ and $\alpha R$ calculated by the wheel slip angle calculating means 13. When it is determined by the determining means 15 that the vehicle is in the usual turning state, braking liquid pressures for the wheel brakes $B_{FL}$, $B_{FR}$, $B_{RL}$ and $B_{RR}$ are calculated by the braking pressure calculating means 16, so that the difference between the detected yaw rate $\gamma$ and a reference yaw rate determined based on the steering angle $\delta$ and the vehicle speed V is small. The braking liquid-pressure control device 4 controls the braking liquid-pressures for the wheel brakes $B_{FL}$, $B_{FR}$, $B_{RL}$ and $B_{RR}$, based on the result of the calculation conducted by the braking pressure calculating means 16. However, when it is determined by the determining means 15 that the vehicle is in the out-of-course state, the rather under-steered state or the rather over-steered state, the braking pressure calculating means 16 stops the calculation for controlling the detected yaw rate γ toward the reference yaw rate, and calculates braking pressures for the wheel brakes $B_{FL}$, $B_{FR}$, $B_{RL}$ and $B_{RR}$, SO that the front wheel slip angle αF and the rear wheel slip angle αR are equal to or smaller than the front and rear wheel slip angle limit values $\alpha F_{LMT}$ and $\alpha R_{LMT}$, and the braking liquid-pressure control device 4 is operated.

The operation of the first embodiment will be described below. In the wheel slip angle calculating means 13, when it is detected by the traveling-state detecting means 17 that the vehicle is in a state in which it is traveling straightforwardly at a low speed, the lateral slip angle β of the vehicle body is calculated based on the second lateral slip angle β2 calculated by the second lateral slip angle calculating section 20. Moreover, the second lateral slip angle β2 is calculated based on the linear two-wheel vehicle motion model from the detected values of the vehicle speed V, yaw rate γ, lateral acceleration AY and steering angle δ, rather than being calculated by integration. Therefore, even if the detected values of the lateral acceleration AY, yaw rate γ and vehicle speed V are small due to the state in which the vehicle is traveling straightforwardly at the low speed, a sensor noise (a mounting-error noise) and a travel noise cannot be accumulated and thus, the lateral slip angle β of the vehicle body can be calculated accurately based on the second lateral slip angle β2.

On the other hand, except for the case where the vehicle is traveling straight at the low speed, the lateral slip angle β of the Vehicle body is calculated based on the first lateral slip angle β1 calculated by the first lateral slip angle calculating section 19. However, among the vehicle speed V, yaw rate γ and presumed lateral acceleration AYE used for calculating the first lateral slip angle β, the detected values of the vehicle speed V and yaw rate γ are relatively large, and the proportion of the magnitude of the noise to the detected values is relatively small. In addition, the presumed lateral acceleration AYE is presumed using the previously established tire characteristics and the slip angle calculated by the slip angle calculating section 22 as well as the slip rate calculated by the slip rate calculating means 11. Therefore, it is possible to enhance the presuming accuracy, and even if the first lateral slip angle β1 is determined by integrating the differentiation value dβ/dt of the lateral slip angle β determined based on the non-linear four-wheel vehicle motion model, the accumulation of the error due to the noise in the integrating calculation course can be maintained to a small level, thereby enhancing the accuracy of the calculation of the lateral slip angle β of the vehicle body.

The lateral slip angle β of the vehicle body presumed with a good accuracy in the above manner indicates the turning behavior state of the vehicle depending on a variation in grip force of the wheels following a variation in turning movement state of the vehicle and a variation in road surface friction coefficient. The front and rear wheel slip angles αF and αR are angles formed by the directions of movement of the front and rear wheels with respect to the orientation of front and rear wheels, and are varied in accordance with the grip forces of the front and rear wheels to the road surface. Moreover, the front and rear wheel slip angle limit values $\alpha F_{LMT}$ and $\alpha R_{LMT}$ can be previously known in accordance with the vehicle speed and the road surface friction coefficient. In the determining means 15, the turning behavior state of the vehicle, i.e., the out-of-course state, the rather under-steered state or the rather over-steered state of the vehicle can be detected by comparing the front and rear wheel slip angles αF and αR calculated based on the lateral slip angle β of the vehicle body with the front and rear wheel slip angle limit values $\alpha F_{LMT}$ and $\alpha R_{LMT}$. Moreover, the front and rear wheel slip angles αF and αR reflect a variation in road surface friction coefficient μ and hence, it is possible to precisely detect the turning behavior state of the vehicle, while reflecting the road surface friction coefficient μ. Thus, the control of the turning behavior by a braking operation depending on the precise detection of the turning behavior state can be carried out.

Figure 11:
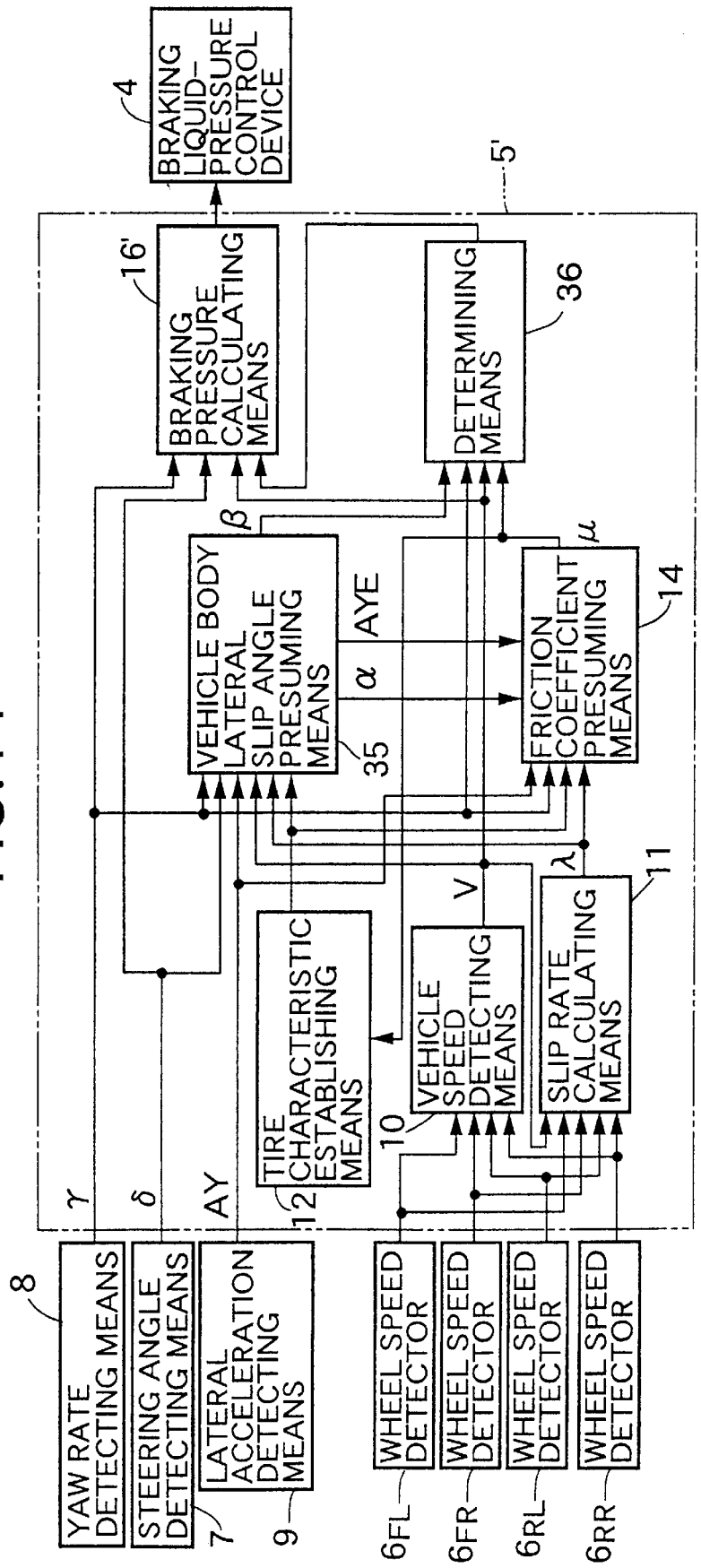

A second embodiment of the present invention in which the over-steered state of the vehicle is detected, will now be described with reference to FIGS. 11 to 14. Referring first to FIG. 11, a control unit 5' for controlling a braking liquid-pressure control device 4 includes a vehicle speed detecting means 10, a slip rate calculating means 11, a tire characteristic establishing means 12, a vehicle body lateral slip angle presuming means 35, a friction coefficient presuming means 14, a determining means 36 for determining the over-steered state of the vehicle, and a braking pressure calculating means 16' for calculating braking pressures for wheel brakes $B_{FL}$, $B_{FR}$, $B_{RL}$ and $B_{RR}$ in the braking liquid-pressure control device 4.

The vehicle body lateral slip angle presuming means 35 presumes a lateral slip angle β of the vehicle body in order to enhance the control accuracy for controlling the turning movement of the vehicle. The lateral slip angle β of the vehicle body is presumed by the vehicle body lateral slip angle presuming means 35, based on a steering angle δ detected by the steering angle detecting means 7, a yaw rate γ detected by the yaw rate detecting means 8, a lateral acceleration AY detected by the lateral acceleration detecting means 9, a vehicle speed V detected by the vehicle speed detecting means 10, a slip rate λ of each wheel calculated by the slip rate calculating means 11, and tire characteristics established by the tire characteristic establishing means 12. The lateral slip angle β determined by the vehicle body lateral slip angle presuming means 35 is input to the determining means 36, and the determination of the over-steered state based on the lateral slip angle β is carried out in the determining means 36.

Figure 12:
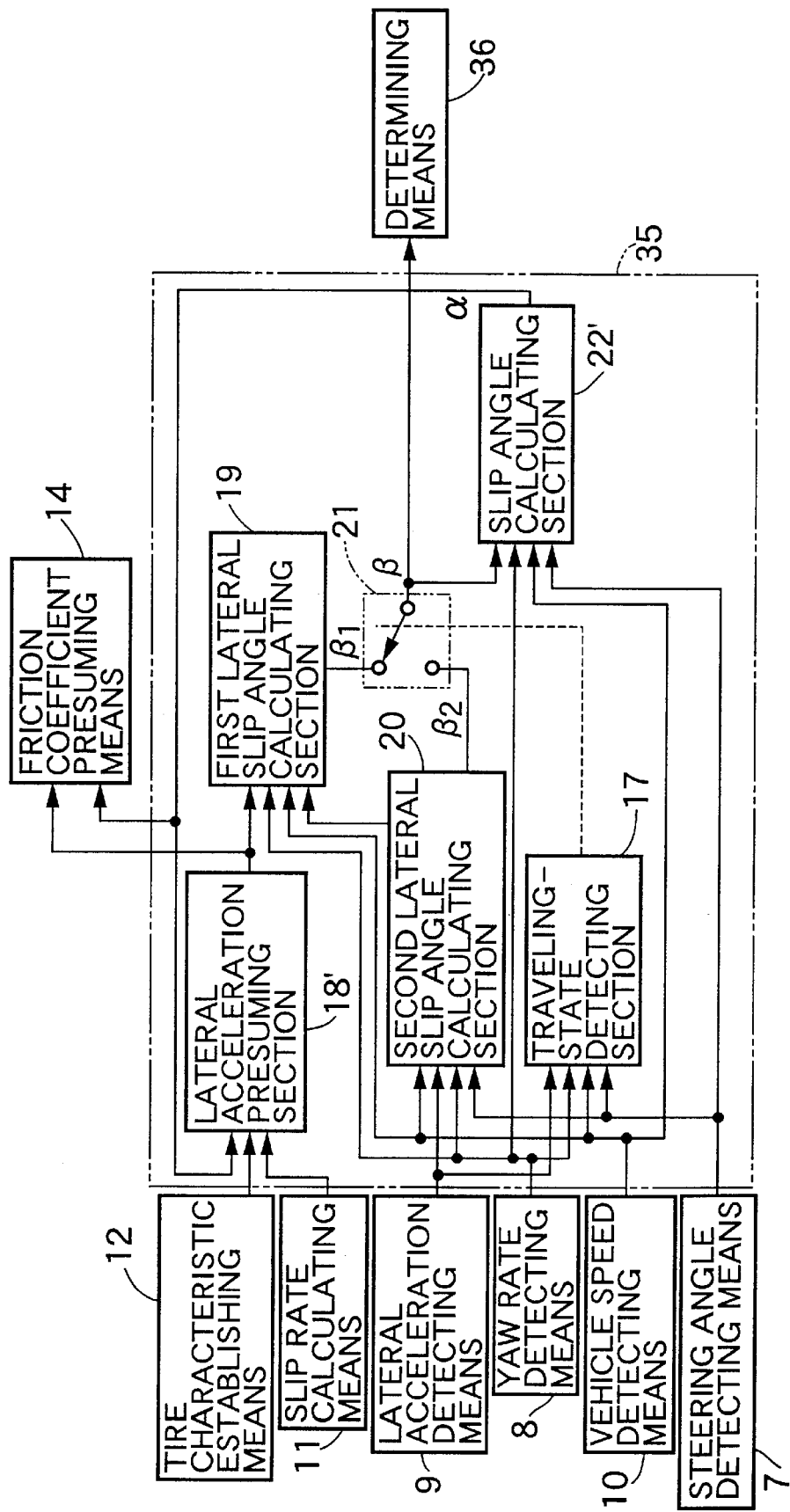

Referring to FIG. 12, the vehicle body lateral slip angle presuming means 35 includes a traveling-state detecting section 17, a lateral acceleration presuming section 18', a first lateral slip angle calculating section 19, a second lateral slip angle calculating section 20, a selecting section 21, and a slip angle calculating section 22'.

The tire characteristic establishing means 12 is connected to the lateral acceleration presuming section 18', and a slip rate λ calculated by the slip rate calculating means 11 and a slip angle a of each wheel calculated by the slip angle calculating section 22' are input to the lateral acceleration presuming section 18'. Thus, an presumed lateral acceleration AYE is determined in the lateral acceleration presuming section 18' in the same manner as in the lateral acceleration presuming section 18 in the first embodiment, based on a total sum of (CF×RCF) of the four wheels, i.e., the left and right front wheels and the left and right rear wheels.

The first lateral slip angle β1 calculated by the first lateral slip angle calculating section 19 and the second lateral slip angle β2 calculated by the second lateral slip angle calculating section 20 are alternatively selected by the selecting section 21 and input to the determining means 36 and to the slip angle calculating section 22'. The alternative selection by the selecting section 21 is switched over by the traveling-state detecting section 17.

In the slip angle calculating section 22', the calculation of the slip angle a of each wheel according to the above-described equations (6) and (7) is carried out using the first or second lateral slip angle β1 or β2 selected by the selecting section 21 and input to the slip angle calculating section 22', the vehicle speed V detected by the vehicle speed detecting means 10, the yaw rate γ detected by the yaw rate detecting means 8 and the steering angle δ detected by the steering angle detecting means 7. The slip angle a of each wheel determined by the slip angle calculating section 22' is input to the lateral acceleration presuming section 18' for the calculation of the presumed lateral acceleration AYE in the lateral acceleration presuming section 18', and also to the friction coefficient presuming means 14.

Referring again to FIG. 11, input to the determining means 36 are the yaw rate γ detected by the yaw rate detecting means 8, the lateral slip angle β presumed by the vehicle body lateral slip angle presuming means 35, the vehicle speed V detected by the vehicle speed detecting means 10, and the road surface friction coefficient $\mu$ presumed by the friction coefficient presuming means 14. The determining means 36 determines that the vehicle is in an over-steered state, when the vehicle body lateral slip angle β exceeds a limit value $\beta_{LMT}$ previously determined based on the vehicle speed V and the friction coefficient $\mu$, in a state in which the yaw rate γ exceeds a limit value $\gamma_{LMT}$ previously determined based on the vehicle speed V and the friction coefficient $\mu$. However, to compare the yaw rate γ and the lateral slip angle β with the limit values $\gamma_{LMT}$ and the limit value $\beta_{LMT}$ in consideration of both the cases where the vehicle is being turned leftwards and where the vehicle is being turned rightwards, absolute values of the yaw rate γ and the lateral slip angle β are used.

Figure 13:
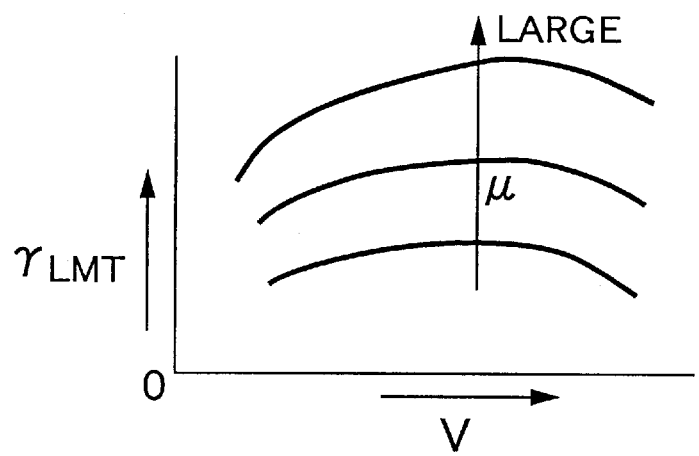
Figure 14:
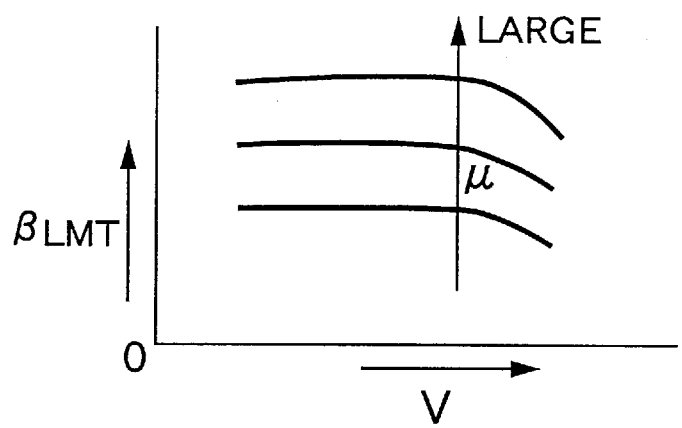

More specifically, the limit value $\gamma_{LMT}$ of the yaw rate γ varied in accordance with variations in vehicle speed V and friction coefficient $\mu$ is previously established in the determining means 36, as shown in FIG. 13. When a relation, $|\gamma| > \gamma_{LMT}$ is established, the determining means 36 determines that the vehicle is in a state in which it is being turned. The limit value $\beta_{LMT}$ of the lateral angle β varied in accordance with variations in vehicle speed V and friction coefficient $\mu$ is also previously established in the determining means 36, as shown in FIG. 14. When $|\gamma| > \gamma_{LMT}$ and $|\beta| > \oplus_{LMT}$, the determining means 36 determines that the vehicle is in the over-steered state.

Input to the braking-pressure calculating means 16' are the steering angle δ determined by the steering angle detecting means 7, the yaw rate γ detected by the yaw rate detecting means 8, the vehicle speed V detected by the vehicle speed detecting means 10, and the result of the determination conducted by the determining means 36. The braking-pressure calculating means 16' calculates braking pressures, based on these inputs.

With one example of the calculation of the braking pressures in the braking-pressure calculating means 16', the calculation of the braking pressures in a usual state and the calculation of the braking pressures in the over-steered state are carried out in the following manner: In the usual state, braking liquid-pressures for the wheel brakes $B_{FL}$, $B_{FR}$, $B_{RL}$ and $B_{RR}$ are calculated by the braking pressure calculating means 16', so that a difference between the detected yaw rate γ and a reference yaw rate determined based on the steering angle δ and the vehicle speed V is small, and the braking liquid-pressure control device 4 controls the braking liquid pressures for the wheel brakes $B_{FL}$, $B_{FR}$, $B_{RL}$ and $B_{RR}$, based on the result of the calculation conducted by the braking pressure calculating means 16'. When it is determined by the determining means 36 that the vehicle is in the over-steered state, the braking-pressure calculating means 16' stops the calculation for controlling the detected yaw rate γ toward the reference yaw rate, and calculates braking pressures, so that one of the wheel brakes $B_{FL}$ and $B_{FR}$ mounted on the left and right front wheels $W_{FL}$ and $W_{FR}$ for an outer wheel as viewed during turning of the vehicle exhibits a maximum braking force as large as the locking of the wheel does not occur, on condition that the speed of variation in detected yaw rate γ is a small value near "0", and the braking liquid-pressure control device 4 is operated, whereby the over-steered state of the vehicle is eliminated.

According to the second embodiment, the vehicle body lateral slip angle β presumed by the vehicle body lateral slip angle presuming means 35 indicates the turning behavior state of the vehicle depending on a variation in movement state of the vehicle and a variation in road surface friction coefficient. On the other hand, the limit value $\beta_{LMT}$ of the lateral slip angle β of the vehicle body can be previously known in accordance with the vehicle speed V and the road surface friction coefficient $\mu$. The determining means 36 determines that the vehicle is being turned, with the yaw rate γ exceeding the limit value $\gamma_{LMT}$ determined in accordance with the vehicle speed V and the road surface friction coefficient $\mu$, and determines that the vehicle is in the over-steered state, with the lateral slip angle β of the vehicle body exceeding the limit value determined based on the vehicle speed V and the road surface friction coefficient $\mu$ during turning movement of the vehicle. Therefore, it is possible to precisely detect the over-steered state of the vehicle, while reflecting a variation in road surface friction coefficient $\mu$. Thus, the control of the turning behavior by a braking operation depending on the precise detection of the over-steered state can be carried out.

Figure 15:
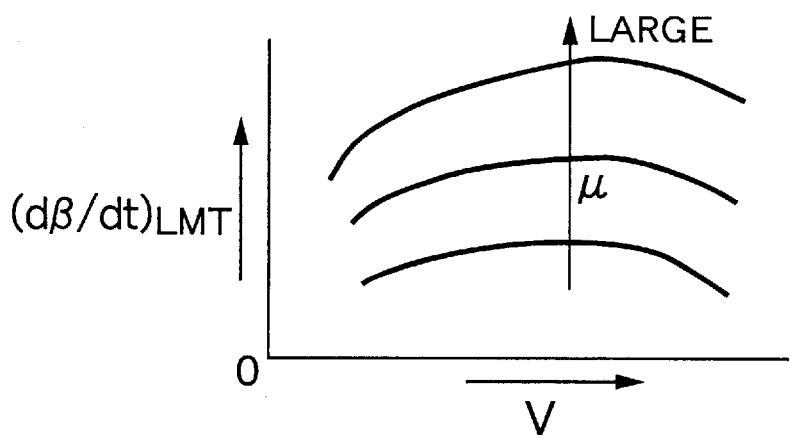
FIG. 15 is a diagram showing a map for establishing the limit value of rate of variation in lateral slip angle of the vehicle body in a third embodiment of the present invention.

In a third embodiment of the present invention, the determining means 36 may determine that the vehicle is being turned, with the yaw rate γ exceeding the limit value $\gamma_{LMT}$ determined in accordance with the vehicle speed V and the road surface friction coefficient $\mu$, and determine that the vehicle is in the over-steered state, with the absolute value of the speed dβ/dt of variation in lateral slip angle β of the vehicle body exceeding a limit value (dβ/dt)LMT previously determined based on the vehicle speed V and the friction coefficient $\mu$, as shown in FIG. 15, when it is determined that the vehicle is being turned.

In this case, when the speed (dβ/dt) of variation in lateral slip angle β of the vehicle body exceeds the limit value $(d\beta/dt)_{LMT}$ determined based on the vehicle speed V and the road surface friction coefficient $\mu$, it can be determined that the vehicle approaches the over-steered state. According to the third embodiment, it is possible to precisely determine that the vehicle approaches the over-steered state, while reflecting a variation in road surface friction coefficient $\mu$.

Although the embodiments of the present invention have been described in detail, it will be understood that the present invention is not limited to the above-described embodiments, and various modifications in design may be made without departing from the spirit and scope of the invention defined in claims.

For example, it is determined that the vehicle is being turned, with the yaw rate γ exceeding the limit value $\gamma_{LMT}$ determined in accordance with the vehicle speed V and the road surface friction coefficient $\mu$ in the above-described embodiments, but any technique may be used, if it is capable of determining that the vehicle is being turned.

What is claimed is:

1. A turning behavior state detecting system for a vehicle, comprising a vehicle speed detecting means for detecting a vehicle speed, a vehicle body lateral slip angle presuming means for presuming a lateral slip angle of a vehicle body, a friction coefficient presuming means for presuming a road surface friction coefficient, and a determining means for determining that the vehicle is in an over-steered state, when the vehicle body lateral slip angle determined by said vehicle body lateral slip angle presuming means or the rate of variation in the vehicle body lateral slip angle exceeds a limit value determined based on the vehicle speed detected by said vehicle speed detecting means and the friction coefficient presumed by said friction coefficient presuming means, during turning movement of the vehicle.

* * * * *